US011144783B2

(12) United States Patent
Yoo et al.

(10) Patent No.: US 11,144,783 B2
(45) Date of Patent: Oct. 12, 2021

(54) SERVERS, NON-TRANSITORY COMPUTER-READABLE MEDIA AND METHODS FOR PROVIDING ARTICLES

(71) Applicant: NAVER Corporation, Seongnam-si (KR)

(72) Inventors: BongSeak Yoo, Seongnam-si (KR);
Eunjoo Jung, Seongnam-si (KR);
Chang Yul Choi, Seongnam-si (KR);
JungHye Yun, Seongnam-si (KR);
Jungdal Jeon, Seongnam-si (KR);
Daewon Jeon, Seongnam-si (KR);
Jaemin Kim, Seongnam-si (KR); Soo Hyang Kim, Seongnam-si (KR);
Hyejin Kim, Seongnam-si (KR);
Hyuntak Sung, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 148 days.

(21) Appl. No.: 16/416,692

(22) Filed: May 20, 2019

(65) Prior Publication Data

US 2019/0354800 A1 Nov. 21, 2019

(30) Foreign Application Priority Data

May 21, 2018 (KR) .................. 10-2018-0057919
Oct. 8, 2018 (KR) .................. 10-2018-0119688

(51) Int. Cl.
*G06K 9/00* (2006.01)
*G06K 9/62* (2006.01)
*G06N 3/08* (2006.01)

(52) U.S. Cl.
CPC ....... *G06K 9/6218* (2013.01); *G06K 9/00469* (2013.01); *G06K 9/623* (2013.01); *G06N 3/08* (2013.01)

(58) Field of Classification Search
CPC .... G06F 16/951; G06F 16/9535; G06F 16/93; G06F 16/24578; G06F 16/355;
(Continued)

(56) References Cited

U.S. PATENT DOCUMENTS

2002/0129015 A1* 9/2002 Caudill ................ G06F 16/353
2004/0139067 A1* 7/2004 Houle .................... G06F 16/35
2016/0004667 A1* 1/2016 Chakerian ............. G06F 16/93
715/277

FOREIGN PATENT DOCUMENTS

JP 2013-140579 A 7/2013
JP 2013-161328 A 8/2013
(Continued)

OTHER PUBLICATIONS

Office Action dated Apr. 13, 2020 in Korean Application No. 10-2018-0119688.
(Continued)

*Primary Examiner* — Alex Kok S Liew
(74) *Attorney, Agent, or Firm* — Harness, Dickey & Pierce, P.L.C.

(57) ABSTRACT

A method of providing news articles by a server includes determining a plurality of clusters of articles among a plurality of articles, ranking each respective cluster among the plurality of clusters of articles based on issue information associated with the respective cluster to determine one or more highest ranked clusters, and causing an electronic device to display a graphical user interface including one or more representative articles corresponding to each of the one or more highest ranked clusters, each respective representative article among the one or more representative articles being selected from among two or more articles among the plurality of articles included in a corresponding cluster among the one or more highest ranked cluster.

21 Claims, 12 Drawing Sheets

(58) Field of Classification Search
CPC ........... G06F 16/2455; G06F 16/24575; G06F 16/334; G06F 16/358; G06F 19/00; G06F 16/35; G06F 16/248; G06F 16/285; G06F 16/338; G06F 16/00; G06F 16/2428; G06F 16/337; G06F 16/353; G06F 16/433; G06F 16/438; G06F 16/48; G06F 16/78; G06F 16/7844; G06F 3/048; G06Q 30/02; G06Q 50/01; G06Q 40/08; G06Q 10/10; G06Q 10/101
See application file for complete search history.

(56) References Cited

FOREIGN PATENT DOCUMENTS

| | | |
|---|---|---|
| JP | 2013-168177 A | 8/2013 |
| KR | 10-2009-0014504 A | 2/2009 |
| KR | 10-2011-0112116 A | 10/2011 |
| KR | 10-2016-0107418 A | 9/2016 |

OTHER PUBLICATIONS

Japanese Office Action dated Jun. 9, 2020 in Japanese Patent Application No. 2019-094646.

\* cited by examiner

SERVERS, NON-TRANSITORY COMPUTER-READABLE MEDIA AND METHODS FOR PROVIDING ARTICLES

CROSS-REFERENCE TO RELATED APPLICATION(S)

This U.S. non-provisional application claims the benefit of priority under 35 U.S.C. § 119 to Korean Patent Application Nos. 10-2018-0119688, filed Oct. 8, 2018, and 10-2018-0057919, filed May 21, 2018, in the Korean Intellectual Property Office (KIPO), the entire contents of each of which are incorporated herein by reference.

BACKGROUND

Field

One or more example embodiments relate to technology for automating news articles.

Description of Related Art

In conventional news information technology, a broadcasting server operating in a broadcasting station gathers news information for the public and transmits the collected news information to user terminals through a broadcasting network at desired time intervals. Here, a time difference occurs between a point in time at which an event associated with news information occurs and a point in time at which a user receives the news information.

Such gathered news information is posted through an Internet search engine instead of using a broadcasting network. The user may search for and verify corresponding news information through a direct connection to an Internet site to receive the posted news information. A large amount of news is provided through Internet sites at any given time. In the case of an event that draws attention of subscribers, many Internet sites provide similar news articles in relation to the corresponding event.

As described above, since current Internet sites duplicate news articles about incidents that are issues, users are repeatedly provided with news articles similar to or the same as previously acquired information and users experience excessive delay in obtaining a new piece of news. Accordingly, a technology for automating news articles by selecting a representative article for each issue would be desirable.

SUMMARY

One or more example embodiments provide methods and systems for collection and/or distribution of news articles based on artificial intelligence (AI).

One or more example embodiments also provide methods and systems for selecting a representative article for each issue by analyzing at least one cluster generated through clustering of contents.

According to an aspect of at least one example embodiment, there is provided a method of providing news articles by a server, the method including determining a plurality of clusters of articles among a plurality of articles, ranking each respective cluster among the plurality of clusters of articles based on issue information associated with the respective cluster to determine one or more highest ranked clusters, and causing an electronic device to display a graphical user interface including one or more representative articles corresponding to each of the one or more highest ranked clusters, each respective representative article among the one or more representative articles being selected from among two or more articles among the plurality of articles included in a corresponding cluster among the one or more highest ranked cluster.

The ranking may include ranking each respective cluster based on an issue level, the issue level being determined based on the issue information including at least one of (i) a quantity of a first subset of articles among the plurality of articles included in the respective cluster or (ii) an article distribution based on time information associated with the respective cluster.

The ranking may include determining a relative section of the respective cluster based on a plurality of time periods elapsed from a plurality of publication times of the first subset of articles included in the respective cluster, and ranking the respective cluster according to a score based on the article distribution corresponding to the relative section.

The ranking may include assigning a publication time based weight to the relative section based on the plurality of publication times of the first subset of articles.

The ranking may be based on the issue level determined based on issue information of a user and using artificial intelligence (AI).

The method may include calculating an article score for each respective article among the plurality of articles, each of the plurality of articles being included in a corresponding cluster among the plurality of clusters of articles, and determining a priority of each respective article among the plurality of articles based on the article score for the respective article.

The method may include adding a new factor to a group of factors used for calculating the article score, wherein the calculating the article score calculates the article score based on the group of factors including the new factor, the article score having a value within a defined range of values.

The method may include assigning a respective weight to each of a group of factors used for calculating the article score, each respective weight having a value between 0 and 1, wherein the calculating the article score calculates the article score based on the group of factors and the respective weight assigned to each of the group of factors.

The method may include selecting a representative article of each respective cluster among the plurality of clusters of articles by analyzing features of two or more articles among the plurality of articles included in the respective cluster, each of the one or more representative articles corresponding to each of the one or more highest ranked clusters being the selected representative article of a corresponding cluster among the one or more highest ranked cluster.

The method may include selecting a different representative article of each respective cluster among the plurality of clusters of articles based on an article score of a user, each of the one or more representative articles corresponding to each of the one or more highest ranked clusters being the selected representative article of a corresponding cluster among the one or more highest ranked cluster.

The selecting the representative article may include selecting the representative article based on one or more features extracted by analyzing the two or more articles included in the respective cluster using a quality model based on an AI neural network.

The selecting the representative article may include determining a plurality of information richness scores corresponding to a plurality of training articles according to an information amount included in the plurality of training articles, the information amount being determined based on one or more article features, determining a plurality of user satisfaction scores corresponding to the plurality of training articles by extracting one or more feedback features related to the plurality of training articles, and training the quality model based on the AI neural network using the plurality of information richness scores and the plurality of user satisfaction scores.

The selecting the representative article may include sorting the two or more articles included in the respective cluster according to a priority based on a result of the training, and selecting the representative article from among the two or more articles included in the respective cluster based on the sorting.

According to an aspect of at least one example embodiment, there is provided a non-transitory computer-readable recording medium storing instructions that, when executed by processing circuitry, cause the processing circuitry to perform a method of providing news articles by a server, the method may include determining a plurality of clusters of articles among a plurality of articles, ranking each respective cluster among the plurality of clusters of articles based on issue information associated with the respective cluster to determine one or more highest ranked clusters, and causing an electronic device to display a graphical user interface including one or more representative articles corresponding to each of the one or more highest ranked clusters, each respective representative article among the one or more representative articles being selected from among two or more articles among the plurality of articles included in a corresponding cluster among the one or more highest ranked cluster.

According to an aspect of at least one example embodiment, there is provided a server for providing news articles, the server may include processing circuitry configured to determine a plurality of clusters of articles among a plurality of articles, rank each respective cluster among the plurality of clusters of articles based on issue information associated with the respective cluster to determine one or more highest ranked clusters, and cause an electronic device to display a graphical user interface including one or more representative articles corresponding to each of the one or more highest ranked clusters, each respective representative article among the one or more representative articles being selected from among two or more articles among the plurality of articles included in a corresponding cluster among the one or more highest ranked cluster.

The processing circuitry may be configured to rank each respective cluster based on an issue level, the issue level being determined based on the issue information including at least one of (i) a quantity of a first subset of articles among the plurality of articles included in the respective cluster or (ii) an article distribution based on time information associated with the respective cluster.

The processing circuitry may be configured to determine a relative section of the respective cluster based on a plurality of time periods elapsed from a plurality of publication times of the first subset of articles included in the respective cluster, and rank the respective cluster according to a score based on the article distribution corresponding to the relative section.

The processing circuitry may be configured to calculate an article score for each respective article among the plurality of articles, each of the plurality of articles being included in a corresponding cluster among the plurality of clusters of articles, and determine a priority of each respective article among the plurality of articles based on the article score for the respective article.

The processing circuitry may be configured to assign a respective weight to each of a group of factors used for calculating the article score, each respective weight having a value between 0 and 1, and calculate the article score based on the group of factors and the respective weight assigned to each of the group of factors.

The processing circuitry may be configured to select a representative article of each respective cluster among the plurality of clusters of articles based on one or more features extracted by analyzing two or more articles among the plurality of articles included in the respective cluster using a quality model based on an AI neural network, each of the one or more representative articles corresponding to each of the one or more highest ranked clusters being the selected representative article of a corresponding cluster among the one or more highest ranked cluster.

According to some example embodiments, it is possible to determine an issue ranking by automating a ranking of a cluster based on an issue level associated with a quantity of articles or an article distribution based on time information.

Also, according to some example embodiments, it is possible to determine a priority of each article based on a score of each of articles included in a cluster.

Also, according to some example embodiments, it is possible to automatically select a representative article of a cluster based on a result of learning features extracted by analyzing articles included in each of clusters based on an AI neural network.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Some example embodiments will be described in more detail with regard to the figures, wherein like reference numerals refer to like parts throughout the various figures unless otherwise specified, and wherein.

Figure 1:
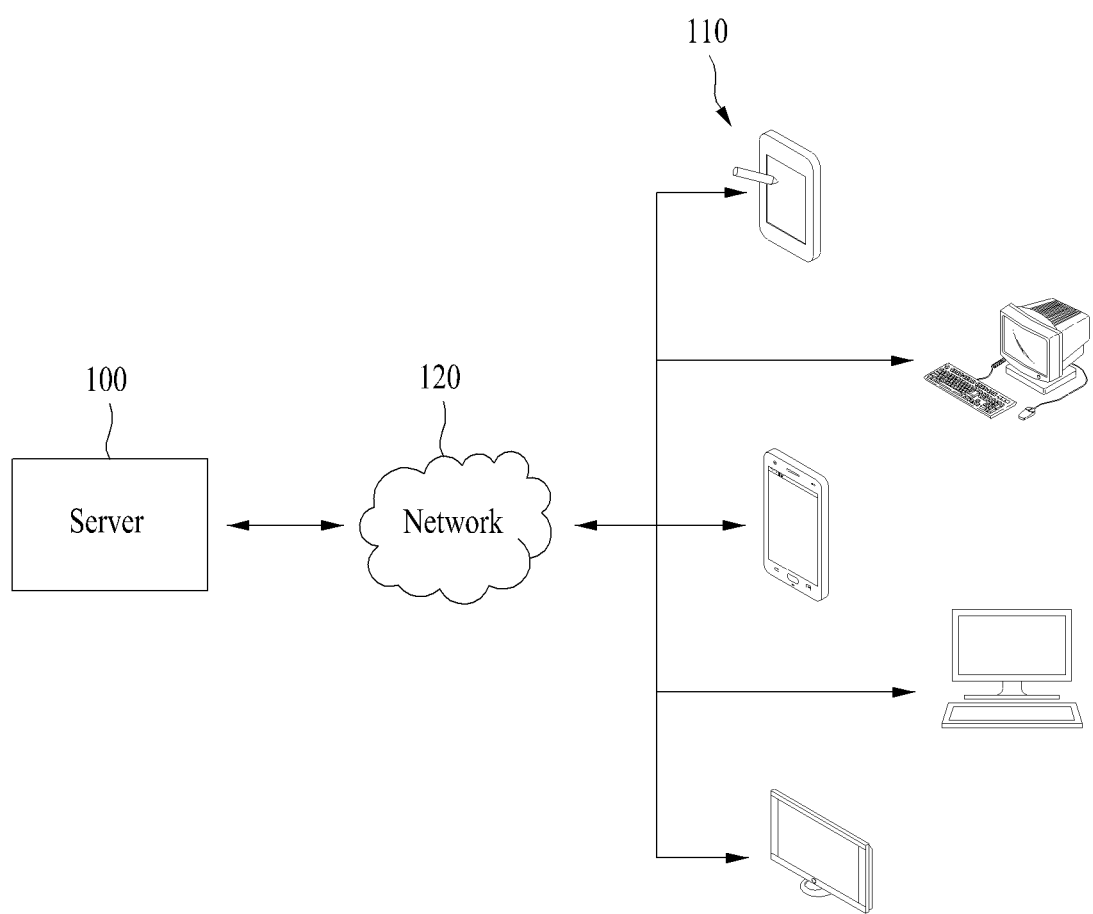
FIG. 1 illustrates an example of a network environment according to at least one example embodiment.

It should be noted that these figures are intended to illustrate the general characteristics of methods and/or structures utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by some example embodiments.

DETAILED DESCRIPTION

One or more example embodiments will be described in detail with reference to the accompanying drawings. Some example embodiments, however, may be embodied in various different forms, and should not be construed as being limited to only the illustrated example embodiments. Rather, some illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products (e.g., elements, features, etc.). Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously (e.g., contemporaneously), or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), a Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes specially programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of some example embodiments, or they may be known devices that are altered and/or modified for the purposes of some example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors, multi-core processors, or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

FIG. 1 is a diagram illustrating an example of a network environment according to at least one example embodiment.

Referring to FIG. 1, the network environment includes an electronic device 110, a server 100, and/or a network 120. FIG. 1 is provided as an example only and the number of electronic devices, the number of servers and/or the number of networks are not limited thereto.

The electronic device 110 may be a fixed terminal or a mobile terminal configured as a computer system. For example, the electronic device 110 may be a smartphone, a mobile phone, a navigation device, a computer, a laptop computer, a digital broadcasting terminal, a personal digital assistant (PDA), a portable multimedia player (PMP), a tablet personal computer (PC), a wearable device, and/or a head mounted display (HMD). For example, the electronic device 110 may communicate with other electronic devices and/or the server 100 over the network 120 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 120. For example, the network 120 may include at least one of network topologies that include, for example, a personal area network (PAN), a local area network (LAN), a campus area network (CAN), a metropolitan area network (MAN), a wide area network (WAN), a broadband network (BBN), and/or the Internet. Also, the network 120 may include at least one of network topologies that include a bus network, a star network, a ring network, a mesh network, a star-bus network, a tree or hierarchical network, and/or the like. However, the above examples are provided as an example only and some example embodiments are not limited thereto.

The server 100 may be configured as a computer apparatus or a plurality of computer apparatuses that provides instructions, codes, files, contents, services, and/or the like through communication with the electronic device 110 over the network 120. For example, the server 100 may provide a file for installing an application to the electronic device 110 connected over the network 120. In this case, the electronic device 110 may install the application using the file provided from the server 100. Also, a service and/or content provided from the server 100 may be provided through connection to the server 100 under control of at least one program, for example, a browser, the installed application, and/or an OS included in the electronic device 110. For example, in response to a service request message transmitted from the electronic device 110 to the server 100 over the network 120 under control of the application, the server 100 may transmit a code corresponding to the service request message to the electronic device 110 and the electronic device 110 may provide content to the user by configuring and displaying a screen corresponding to the code under control of the application.

For example, a representative article of a corresponding issue may be selected by automatically analyzing contents of articles among various types of contents. Here, a news automation method for selecting an issue by automating a ranking of a cluster based on a quantity of articles and an article distribution, determining a priority of each of articles included in a corresponding cluster sorted based on article importance, and providing a headline/representative article of a cluster from each cluster is described.

Figure 2:
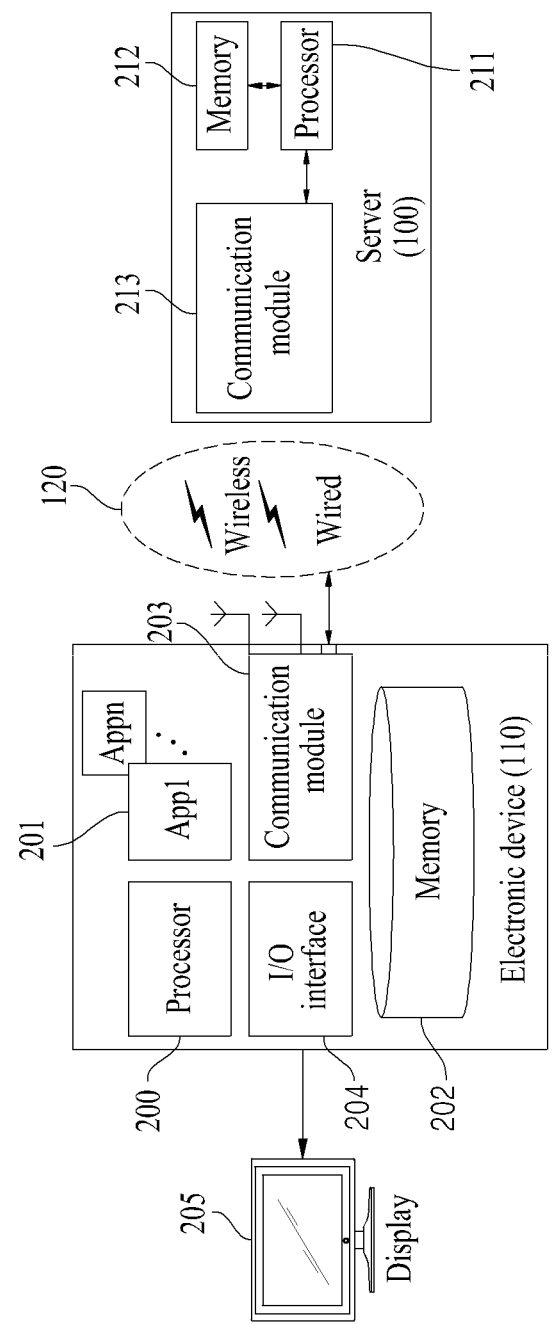
FIG. 2 illustrates an example of an electronic device and a server according to at least one example embodiment.

FIG. 2 illustrates an example of an electronic device and a server according to at least one example embodiment. Although a configuration of a single terminal and a configuration of a single server are described with reference to FIG. 1, the same or similar components may apply to still other terminals and/or still other servers includable in the network environment of FIG. 1.

Referring to FIG. 2, the electronic device 110 may include, for example, at least one processor 200 (also referred to herein as the processor 200), at least one application 201, a memory 202, a communication module 203, an I/O interface 204, and/or a camera, but is not limited thereto.

The server 100 may include at least one processor 211 (also referred to herein as the processor 211), a memory 212, and/or a communication module 213, but is not limited thereto. The memory 202, 212 may include a permanent mass storage device, such as random access memory (RAM), a read only memory (ROM), and/or a disk drive, as a non-transitory computer-readable storage medium. Also, an OS and/or at least one program code, for example, a code for a browser installed and executed on the electronic device 110 or the application, may be stored in the memory 202, 212. Such software components may be loaded from another non-transitory computer-readable storage medium separate from the memory 202, 212. The other non-transitory computer-readable storage medium may include a non-transitory computer-readable storage medium, for example, a floppy drive, a disk, a tape, a Blu-ray/DVD/CD-ROM drive, a memory card, etc. According to some example embodiments, software components may be loaded to the memory 202, 212 through the communication module 203, 213, instead of, or in addition to, the non-transitory computer-readable storage medium. For example, at least one program may be loaded to the memory 202, 212 based on a program, for example, the application, installed by files provided over the network 120 from developers and/or a file distribution system, for example, the server 100, which provides an installation file of the application.

The processor 200, 211 may be configured to process computer-readable instructions of a computer program by performing basic arithmetic operations, logic operations, and/or I/O operations. The computer-readable instructions may be provided from the memory 202, 212 and/or the communication module 203, 213 to the processor 200, 211. For example, the processor 200, 211 may be configured to execute received instructions in response to the program code stored in the storage device, such as the memory 202, 212, thereby transforming the processor 200, 211 into a special purpose processor for performing the functionality of the program code.

The communication module 203, 213 may provide a function for communication between the electronic device 110 and the server 100 over the network 120, and may provide a function for communication with another electronic device and/or another server. For example, the processor 200 of the electronic device 110 may transfer a request created based on a program code stored in the storage device, such as the memory 202, to the server 100 over the network 120 under control of the communication module 203. Inversely, a control signal, an instruction, content, a file, etc., provided under control of the processor 211 of the server 100 may be received at the electronic device 110 through the communication module 203 of the electronic device 110 by going through the communication module 213 and the network 120. For example, a control signal, an instruction, etc., of the server 100 received through the communication module 203 may be transferred to the processor 200 and/or the memory 202, and content, a file, etc., may be stored in a storage medium further includable in the electronic device 110.

The I/O interface 204 may be a device used for interface with an I/O device (e.g., a display 205). For example, an input device may include a device, such as a keyboard, a mouse, a microphone, a camera, etc., and an output device may include a device, such as a display device, for displaying data associated with a communication session of the application, a projector, a speaker, etc. As another example, the I/O interface 204 may be a device for interface with an apparatus in which an input function and an output function are integrated into a single function, such as a touchscreen. In detail, when processing instructions of the computer program loaded to the memory 202, the processor 200 of the electronic device 110 may display a service screen configured using data provided from the server 100 and/or another electronic device, and/or may display content on a display 205 through the I/O interface 204.

According to some example embodiments, the electronic device 110 and/or the server 100 may include a number of components greater or less than a number of components shown in FIG. 2. For example, the electronic device 110 may include at least a portion of the I/O device, or may further include other components, for example, a transceiver, a global positioning system (GPS) module, a camera, a variety of sensors, a database (DB), and/or the like. In detail, if the electronic device 110 is a smartphone, the electronic device 110 may be configured to further include a variety of components, for example, an accelerometer sensor, a gyro sensor (e.g., gyroscope), a camera module, various physical buttons, a button using a touch panel, an I/O port, a haptic feedback motor for vibration, etc., which are generally included in the smartphone.

Figure 3:
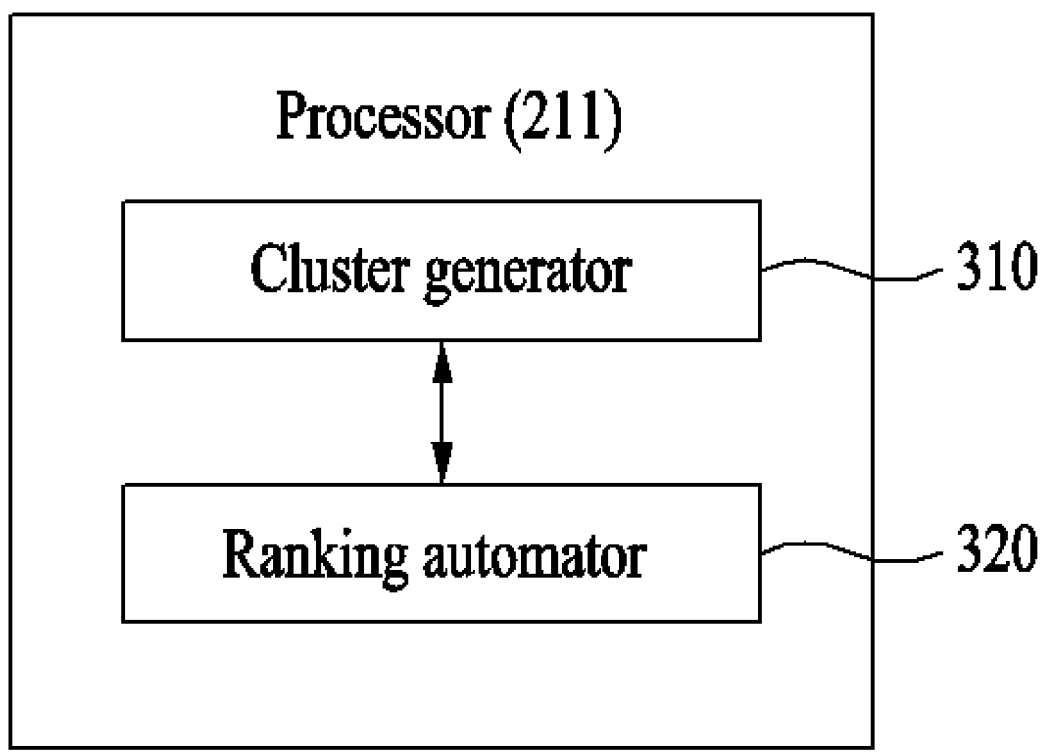
FIG. 3 illustrates an example of components includable in a processor of a server according to at least one example embodiment.
Figure 4:
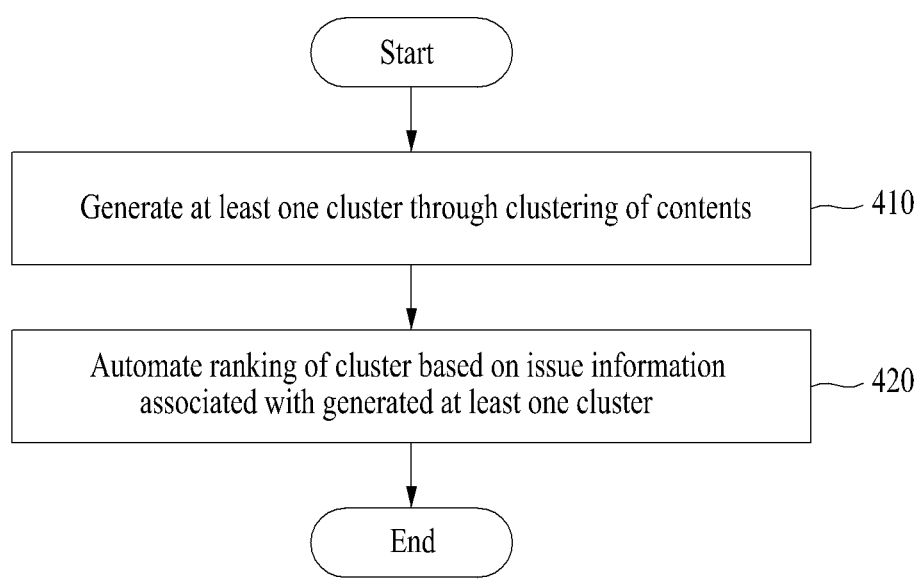
FIG. 4 is a flowchart illustrating an example of a method of automating ranking of news articles at a server according to at least one example embodiment.

FIG. 3 illustrates an example of components includable in a processor of a server according to at least one example embodiment, and FIG. 4 is a flowchart illustrating an example of a method of automating news articles at a server according to at least one example embodiment;

Referring to FIG. 3, the processor 211 of the server 100 may include a cluster generator 310 and/or a ranking automator 320. The components of the processor 211 may be representations of different functions performed by the processor 211 in response to a control instruction that is provided from a program code stored on the server 100. The processor 211 and/or the components of the processor 211 may control the server 100 to perform operations 410 and/or 420 included in the method of automating news articles. Here, the processor 211 and the components of the processor 211 may be configured to execute an instruction according to a code of at least one program and/or a code of an OS included in a memory.

The processor 211 may load, to the memory, a program code stored in a file of a program for the method of automating news articles. For example, in response to executing the program at the server 100, the processor 211 may control the server 100 to load, to the memory, the program code from the file of the program under control of the OS. Here, the processor 211 and the cluster generator 310 and the ranking automator 320 included in the processor 211 may be different functional representations of the processor 211 to perform operations 410 and 420 by executing an instruction of a portion corresponding to the program code loaded to the memory. According to some example embodiments, operations described herein as being performed by any or all of the server 100, the cluster generator and the ranking operator may be performed by processing circuitry (e.g., the processor 211) executing program code that includes instructions corresponding to the operations. The instructions may be stored in a memory of the server 100 (e.g., the memory 212). The term 'processing circuitry,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

Referring to FIG. 4, in operation 410, the cluster generator 310 may generate (e.g., determine) at least one cluster through clustering of contents (e.g., among a plurality of contents, such as articles). The cluster generator 310 may generate at least one cluster by clustering various contents for each issue. Hereinafter, some example embodiments will be described using an article among the contents. For example, the cluster generator 310 may generate at least one cluster by clustering contents for each issue through a clustering scheme based on recently fed (e.g., published) 25,000 articles. The cluster generator 310 may prioritize articles included in each of the at least one cluster. Also, the cluster generator 310 may select a representative article of a cluster from each of the at least one cluster.

Figure 11:
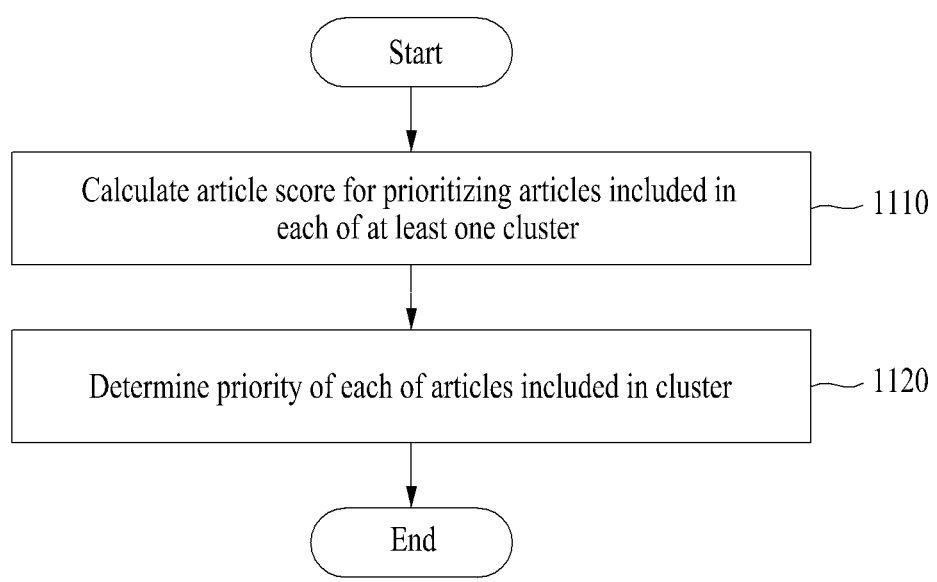
FIG. 11 is a flowchart illustrating an example of a method of prioritizing articles included in each of at least one cluster at a server according to at least one example embodiment.

FIG. 11 is a flowchart illustrating an example of a method of prioritizing articles included in each of at least one cluster according to at least one example embodiment.

Referring to FIG. 11, in operation 1110, the cluster generator 310 may calculate an article score for prioritizing articles included in each of at least one cluster. The cluster generator 310 may quantify an importance and/or a determination for each article by assigning an additional score to articles included in each of clusters and by prioritizing the articles. The cluster generator 310 may represent (e.g., determine), as a numerical value, each of various factors, for example, (1) article relation and/or importance, (2) article time (e.g., recency), (3) particular article attribute (e.g., whether a particular keyword is included in the article), (4) article length (e.g., page and/or word length), and/or (5) quality score, to calculate an article score.

The cluster generator 310 may generate (e.g., determine) one or more article factors used to quantify the importance and/or determination for each article. Here, the cluster generator 310 may calculate an article score for each article to determine rankings of individual articles with respect to articles included in a cluster/issue for which articles are clustered, based on the article factor. For example, a score of 0 to 10 (e.g., a score within a desired and/or defined range) may be assigned to each article. Such an article score may be calculated according to the following Equation 1. Here, a new factor may be added to Equation 1 used to calculate the article score. The article score calculated based on factors including the new factor may be calculated as a value within a desired range to prioritize the articles, that is, determine rankings of the articles.

[Equation 1]

Article score $(w) =$ $$\frac{(a1*x_1 + a2*x_2 + a3*x_3 + a4*x_4 + a5*x_{5+\ldots}+an*x_n)*10}{(a1 + a2 + a3 + a4 + a5 \ldots + an)}$$

In Equation 1, w denotes an article score of 0 to 10 and each of $x_1$ to $x_n$ denotes an article factor and may be determined using various factors, for example, (1) article relation and/or importance, (2) additional point for article time (e.g., recency), (3) additional score for article attribute (e.g., whether a particular keyword is included in the article), (4) additional score for article length (e.g., page and/or word length), and/or (5) quality score. Here, a corresponding value may be determined as a score within the range of 0 to 1 or a value of 0 or 1.

In the case of the article relation and/or importance, the cluster generator 310 may assign a score based on a similarity level of an article in the same or a similar cluster. In the case of the additional score (e.g., point) for article time, the cluster generator 310 may assign a relatively high score to an early article, and may assign a relatively low article to a late article based on an article time (e.g., (1) an article publication date and/or time, and/or (2) a duration between the article publication date and/or time and a current date and/or time). For example, the cluster generator 310 may assign 1 score (e.g., a score of "1") to an article corresponding to an article time of 0 to 1 hour, 0.5 score to an article corresponding to an article time of 1 to 2 hours, and 0.1 score to an article corresponding to an article time of 3 hours or more. In the case of the additional score for article attribute, the cluster generator 310 may assign a score depending on whether a specific attribute is present. For example, if a 'sole' keyword is determined as a significant attribute for an article, the cluster generator 310 may assign 1 score to an article that includes the keyword "sole". Also, the cluster generator 310 may assign a score based on a length of an article. For example, the cluster generator 310 may assign a relatively high score to a relatively long article (e.g., an article higher than a defined threshold value in word and/or page length) and may assign a relatively low score to a relatively short article (e.g., an article shorter than a defined threshold value in word and/or page length). Also, the cluster generator 310 may calculate a ratio between the length of the article and a maximum length of an article (e.g., an upper limit threshold article length) and may assign a score (e.g., based on whether the calculated ratio is above or below a defined threshold value). The cluster generator 310 may assign a score to an initially reported article that is an oldest article among articles having a document similarity of 80% or more (e.g., a quality score). Further, examples of article factors may include whether to be displayed as a main article (e.g., a main headline article), a comment, a user feedback, and/or the like (e.g., a quality score).

Each of a1 to an denotes a weight for each item, and each of a1 to an may be set such that a value between 0 and 1 is an initial value, and an optimal, improved and/or more accurate value may be acquired through monitoring. For example, as initial values, a1 may be set to 1, a2 may be set to 1, a3 may be set to 1, a4 may be set to 0.5, and a5 may be set to 0.8. The cluster generator 310 may derive an optimal, improved and/or more accurate value with respect to each weight through machine learning. Accordingly, all of the articles may have a uniform value within the range of 0 to 10.

In operation 1120, the cluster generator 310 may determine a priority of each of the articles included in each of the at least one cluster based on the calculated article score. The cluster generator 310 may determine a relative priority between articles included in a cluster. The cluster generator 310 may sort the articles included in the cluster in descending order or ascending order based on priorities of articles to which the article score is assigned. As described above, the cluster generator 310 may further conveniently manage articles using quantified values within a desired range for the articles.

Figure 12:
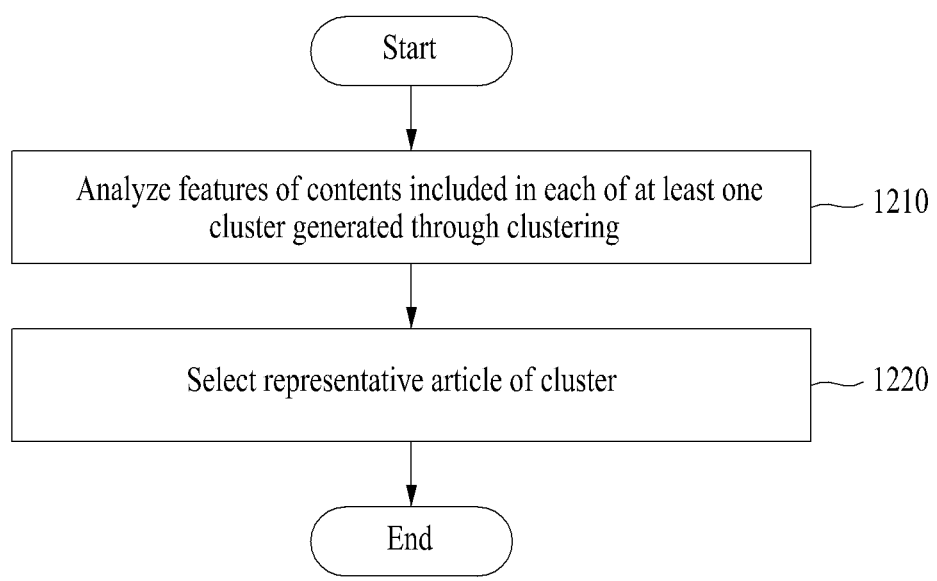
FIG. 12 is a flowchart illustrating an example of a method of selecting a representative article of a cluster at a server according to at least one example embodiment.

FIG. 12 is a flowchart illustrating an example of a method of selecting a representative article of a cluster at a server (e.g., the server 100) according to at least one example embodiment.

Referring to FIG. 12, in operation 1210, the cluster generator 310 may analyze features of contents included in each of at least one cluster generated through clustering. For example, the cluster generator 310 may learn features extracted by analyzing articles included in each of the at least one cluster, based on an AI neural network.

In operation 1220, the cluster generator 310 may select a representative article of a cluster. The cluster generator 310 may select a representative article of a cluster based on rankings of articles included in the cluster acquired by analyzing features of contents included in each of the at least one cluster. For example, the highest ranking article included in the cluster may be selected as the representative article of the cluster. According to some example embodiments, the cluster generator 310 may select the representative article of the cluster based on the relative priorities between articles in a cluster according to operation 1120 discussed above. The cluster generator 310 may select a representative article of a cluster from among articles included in each of the clusters by sorting the articles prioritized based on a result of learning based on the AI neural network. The cluster generator 310 may automatically arrange the representative article selected from each of the clusters.

Here, the cluster generator 310 may calculate an additional score of the representative article in the cluster. The cluster generator 310 may assign the additional score to the selected representative article, for example, a main headline article. Also, the cluster generator 310 may further assign the same or a similar additional score as the additional score for each timeline to the selected representative article, based on an article feeding time. Also, if a relation importance score of the representative article is less than an average relation importance score of articles included in a corresponding cluster, the cluster generator 310 may remove the additional score.

Also, the cluster generator 310 may extract a different representative article from each of the at least one cluster by applying an article score of a user. For example, the cluster generator 310 may derive a user-oriented article score based on AI. The cluster generator 310 may calculate an article score in which a user preference is applied based on AI and may select a representative article of a cluster based on the calculated article score. For example, an article included in the cluster having a highest user-oriented article score may be selected as the representative article of the cluster.

In operation 420, the ranking automator 320 may automate a ranking of a cluster based on issue information associated with the generated at least one cluster. The issue information may include one or more of a quantity of articles in the cluster, an article distribution, a reaction to articles in the cluster (e.g., a quantity of upvotes and/or downvotes, and/or a quantity of comments), etc. The ranking automator 320 may determine the ranking of the cluster by analyzing the issue information of at least one cluster. The ranking automator 320 may determine a ranking of the at least one cluster based on an issue level that is determined in relation to the issue information including a quantity of articles and/or an article distribution based on time information associated with the generated at least one cluster.

Figure 5:
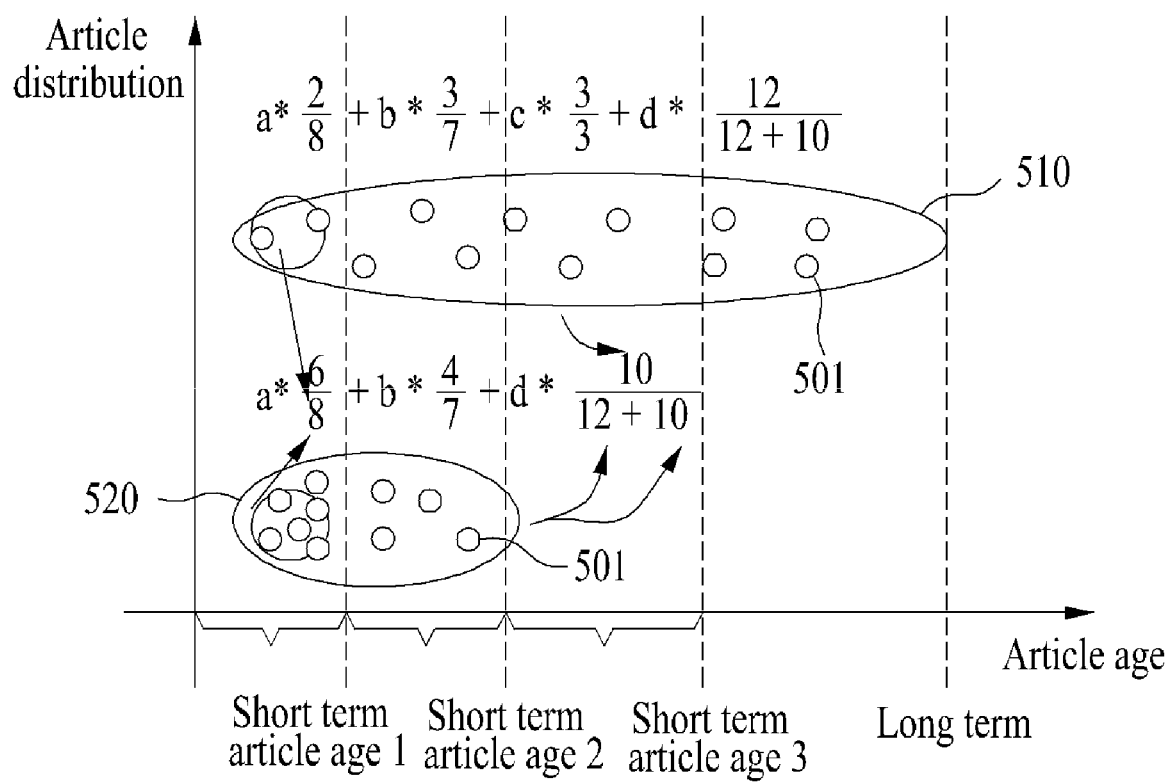
FIG. 5 is a graph showing an example for describing a process of determining a ranking of a cluster based on an issue level at a server according to at least one example embodiment.

Hereinafter, a process of determining a ranking of a cluster based on an issue level according to at least one example embodiment is described with reference to FIG. 5. Referring to FIG. 5, the ranking automator 320 may determine a ranking of a cluster based on an issue level associated with the entire quantity of articles and/or article distribution, such as a total quantity of articles for each article feeding time (e.g., publication date and/or time) or each timeline (e.g., articles published within a defined date and/or time range), in addition to a quantity of articles. For example, an issue may be selected to be proportional to a quantity of articles produced by the press that is a news creator. Here, the ranking automator 320 may determine a ranking of the issue, for example, a cluster, based on a level of the issue. Here, the issue level indicates a score used to determine a ranking of a cluster by applying a plurality of indices. For example, a plurality of clusters may be acquired by classifying all of the articles for each issue and/or each section through clustering. A main issue, that is, a portion of articles present in a cluster may be exposed, that is, provided among articles based on the issue level. In the related art, an article is exposed based on a number of articles. To prevent or reduce only a main issue of a corresponding day from being continuously maintained without updating a recent article, the present disclosure may apply an additional score to the recent article such that the recent article may be exposed, that is, provided. Accordingly, it is possible to select a main issue capable of preventing, reducing and/or complementing a filter bubble, which differs from an individual recommendation scheme.

In detail, a logic of applying an issue level is described. Referring to FIG. 5, the logic of applying an issue level may consider a long term and a short term together with respect to a cluster of each article, and may set a short-term article age to not an absolute section but a relative section and may provide desired quality of articles regardless of a quantity of articles.

For example, a method of applying an issue level is described using two clusters, for example, a first cluster 510 and a second cluster 520. Here, the two clusters are provided as an example only and the present disclosure is not limited thereto. Referring to a graph of FIG. 5, each point 501 represents an article, and a bundle including the points 501 represents a cluster, for example, the first cluster 510 and the second cluster 520. Also, an article age on an x axis represents a time elapsed from a point in time at which a corresponding article is fed, and an article distribution on an y axis represents a position at which each corresponding article is distributed. The article distribution indicates a ratio of a total sum of a number (or scores) of specific term articles (e.g., short term articles and/or long term articles) among articles of each cluster (e.g., a respective) to a total sum of a number (or scores) of specific term articles among articles of the entire clusters (e.g., in all clusters). The short term article age indicates an oldest article age among articles corresponding to a set section or time (e.g., %, 10%, 30 minutes) in a cluster article pool. Through this, a short term article age 1 short term distribution, a short term article age 2 short term distribution, and/or a short term article age 3 short term distribution may be derived. Also, in a long term distribution, a short term article age 1 short term additional score, a short term article age 2 short term additional score, a short term article age 3 short term additional score, and/or a long term additional score may be derived. Here, the long term distribution may be acquired by calculating a total sum (e.g., number and/or scores) of articles with an article length greater than 300 letters in a corresponding cluster divided by a total sum (e.g., number and/or scores) of articles of the entire clusters (e.g., in all clusters). The short term distribution may be acquired by relatively dividing a section in which articles are distributed. For example, a section occupied by articles by 10% may be divided (e.g., a section of articles including the first 10% of articles in the cluster by order of publication date and/or time). According to some example embodiments, a relative section of a respective cluster may be determined based on a time elapsed from publication times of articles included in the respective cluster. According to some example embodiments, the short term distribution may be acquired by calculating a total sum (e.g., number and/or scores) of articles (i) published within a defined period of time (e.g., 30 minutes) from a specific date and/or time, (ii) with an article length greater than 300 letters, and (iii) in a corresponding cluster, divided by a total sum (e.g., number and/or scores) of articles of the entire clusters (e.g., in all clusters) published within the defined period of time from the specific date and/or time. In FIG. 5, the short term article age section is divided into three sections. For example, the short term article age may be selected by calculating a largest number from a number of fed articles at desired intervals, for example, every 5 days or 30 minutes, to a total number of articles of a specific date.

Figure 6:
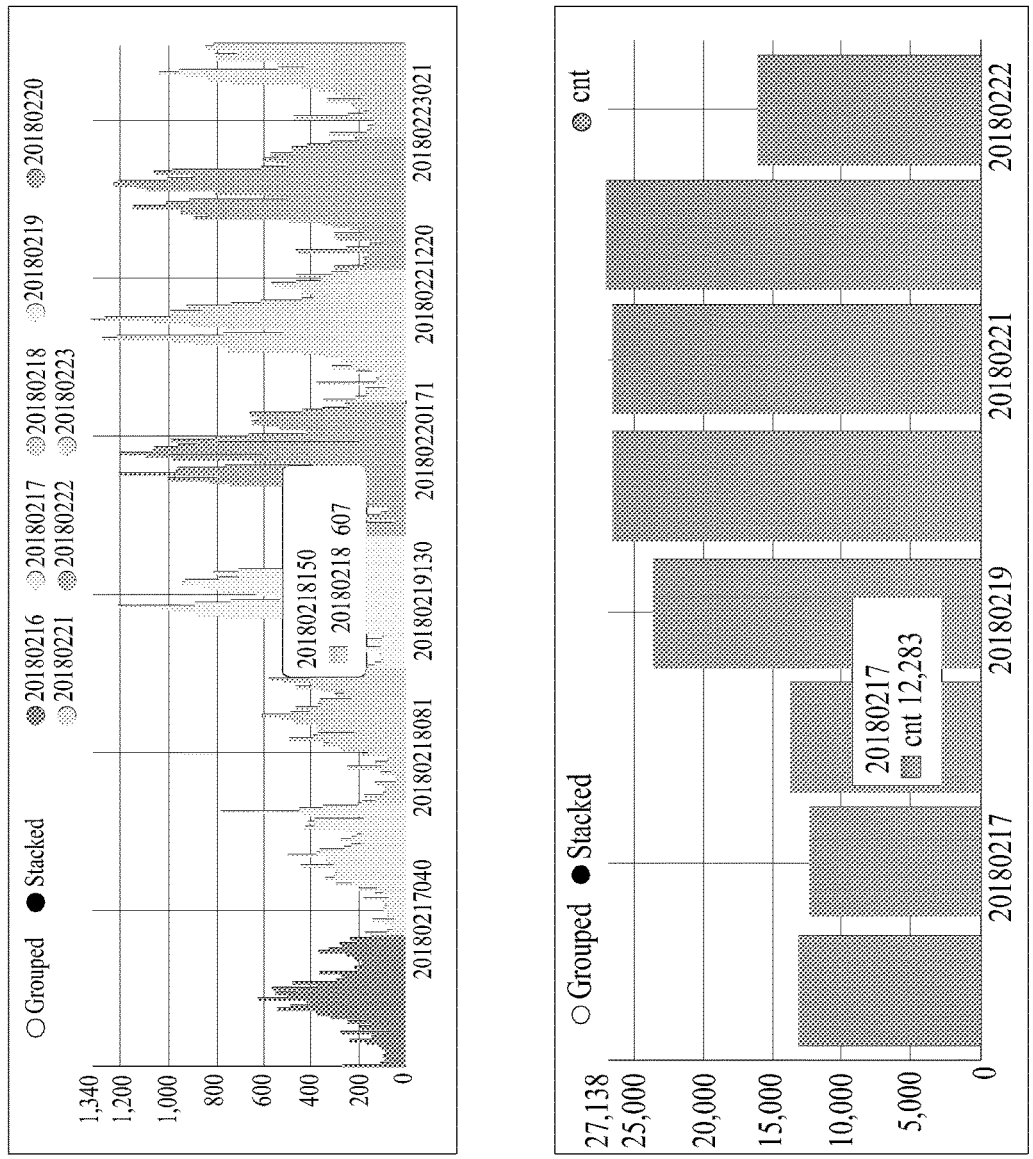
FIGS. 6 and 7 are graphs showing examples of 1-week statistical data of channel interactive press articles and 1-week statistical data of the entire press articles according to at least one example embodiment.

Table 1 and FIG. 6 show 1-week statistical data and show 1-week ratio values based on channel interactive press articles. Here, the average 1-week ratio value is 4.75.

TABLE 1

| date | maximum (e.g., total) number of articles per 30 minutes (a) | maximum (e.g., total) number of articles per day (b) | ratio |
| --- | --- | --- | --- |
| 20180222 | 1237 | 27138 | 4.55 |
| 20180221 | 1340 | 26544 | 5.04 |
| 20180220 | 1221 | 26609 | 4.58 |
| 20180219 | 1223 | 23665 | 5.16 |
| 20180218 | 607 | 13811 | 4.39 |
| 20180217 | 787 | 12283 | 6.4 |
| 20180216 | 628 | 13118 | 4.78 |

Figure 7:
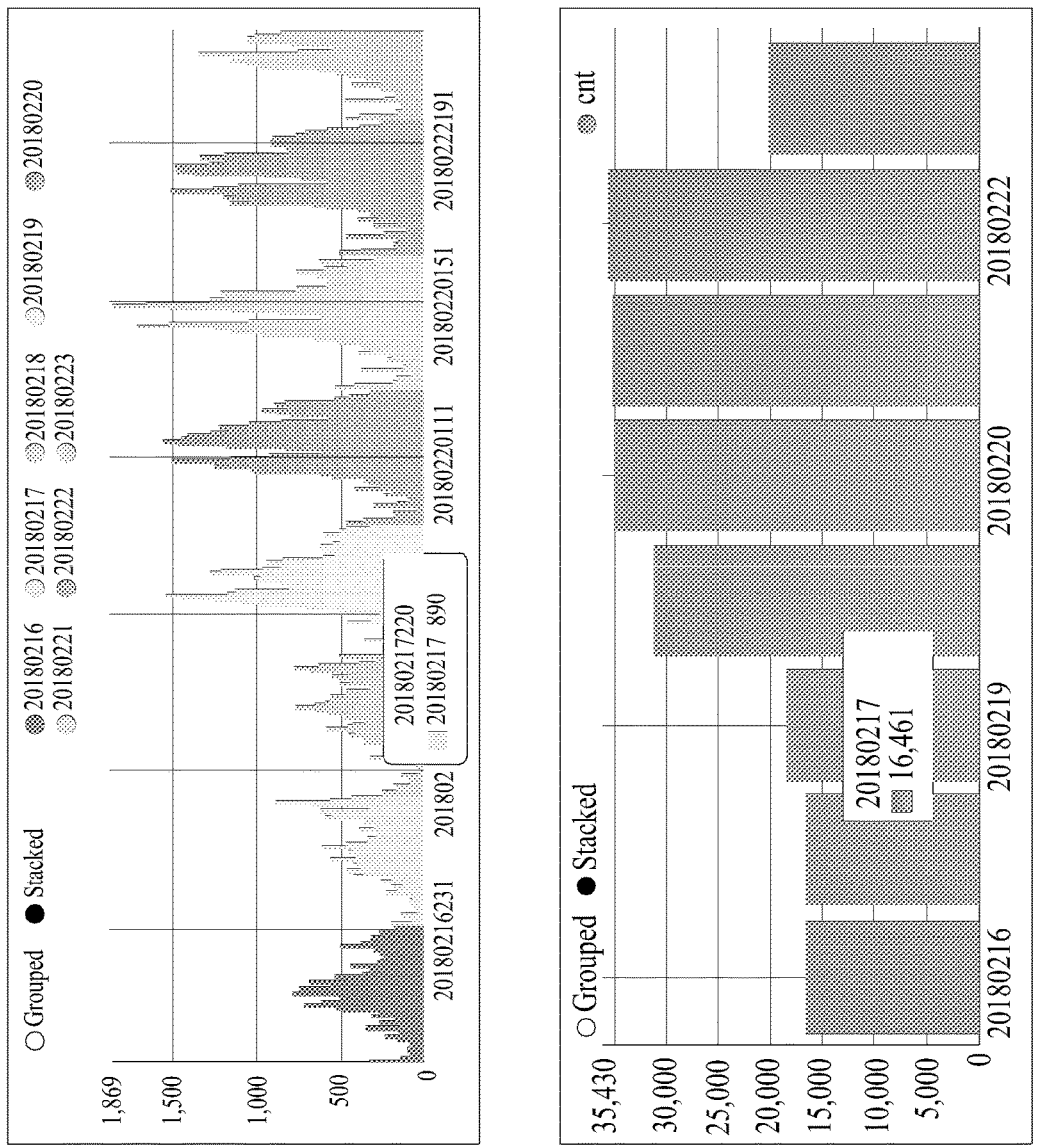

Table 2 and FIG. 7 show 1-week ratio values based on the entire press articles. Here, the average 1-week ratio value is 4.99. Table 2 represents 1-week statistical data of the entire press articles.

TABLE 2

| date | maximum (e.g., total) number of articles per 30 minutes (a) | maximum (e.g., total) number of articles per day (b) | ratio |
| --- | --- | --- | --- |
| 20180222 | 1505 | 35430 | 4.24 |
| 20180221 | 1869 | 35008 | 5.33 |
| 20180220 | 1562 | 34790 | 4.48 |
| 20180219 | 1547 | 31134 | 4.96 |
| 20180218 | 781 | 17982 | 4.34 |
| 20180217 | 890 | 16461 | 5.4 |
| 20180216 | 789 | 16491 | 4.78 |

Here, it is possible to change a size of a section (e.g., a duration of a period term) occupied by articles and a number of articles and to assign a weight (e.g., a publication date and/or time based weight) to a section in which a recent article is present. Each short term article age (e.g., short term article section) may be calculated as follows: the first section may be calculated as a total sum (e.g., number and/or scores) of articles of a corresponding cluster during short term article age 1 with respect to a total sum (e.g., number and/or scores) of articles of the entire clusters during the short term article age 1, the second section may be calculated as a total sum (e.g., number and/or scores) of articles of a corresponding cluster during short term article age 2 with respect to a total sum (e.g., number and/or scores) of articles of the entire clusters during the short term article age 2, and the third section may be calculated as a total sum (e.g., number and/or scores) of articles of a corresponding cluster during short term article age 3 with respect to a total sum (number or scores) of articles of the entire clusters during the short term article age 3. Here, an optimal, improved and/or more accurate value may be acquired by applying a weight to each section. That is, for example, as an initial value, the weight of the first section (depicted as 'a') may be calculated as 3, the weight of the second section (depicted as 'b' may be calculated as 2, the weight of the third section (depicted as 'c') may be calculated as 5, and d may be calculated as 10. Here, a weight may be further assigned to a value corresponding to a recent section among a, b, and c. d refers to a weight of a total quantity of articles and thus, may be set as a value to be affected since a value of a denominator is great. For example, an initial value of d may be set as 10 to complement an occurrence of a case in which a large cluster is not exposed, that is, to complement a case in which only a recent article is updated too quickly. Values of a, b, c, and d may be changed by a user and/or a manager. Also, if a sum of long terms is greater than a sum of short terms, a value of a long term may be limited to be less than or equal to a maximum and/or upper limit value of a short term.

In some example embodiments, if a total sum of articles is calculated using a total sum of article scores, a cluster including a single article may be displayed at a top. Alternatively, if a total sum of articles is calculated using a number of articles, a cluster including a single article may be displayed at a bottom. As described above, an issue with desired quality and a representative article may be derived regardless of weekdays or weekend and a quantity of articles by considering a cluster of articles based on a long term and a short term together and by changing a short term article age into a relative section. Here, the relative section may be changed through monitoring. Also, the relative section may be adjusted by assigning a weight based on a quantity of articles and a recent article for each section. According to some example embodiments, each cluster is ranked based on the issue information as discussed above, and the cluster rank is used to determine which cluster(s) of articles should be represented (e.g., with one or more representative article(s), etc.) on an article display screen and/or in what order each cluster of articles should be represented (e.g., with a highest ranking cluster appearing at the top of an article display screen).

Further, the ranking automator 320 may automate a ranking of a cluster based on an issue level (e.g., an issue score) that is determined in relation to issue information of the user for automating the ranking of the cluster based on AI. For example, a cluster having a higher issue level may be ranked higher than a cluster having a lower issue level. Here, the ranking automator 320 may provide a different issue ranking for each individual, that is, each user by applying an issue score for each user.

Figure 8:
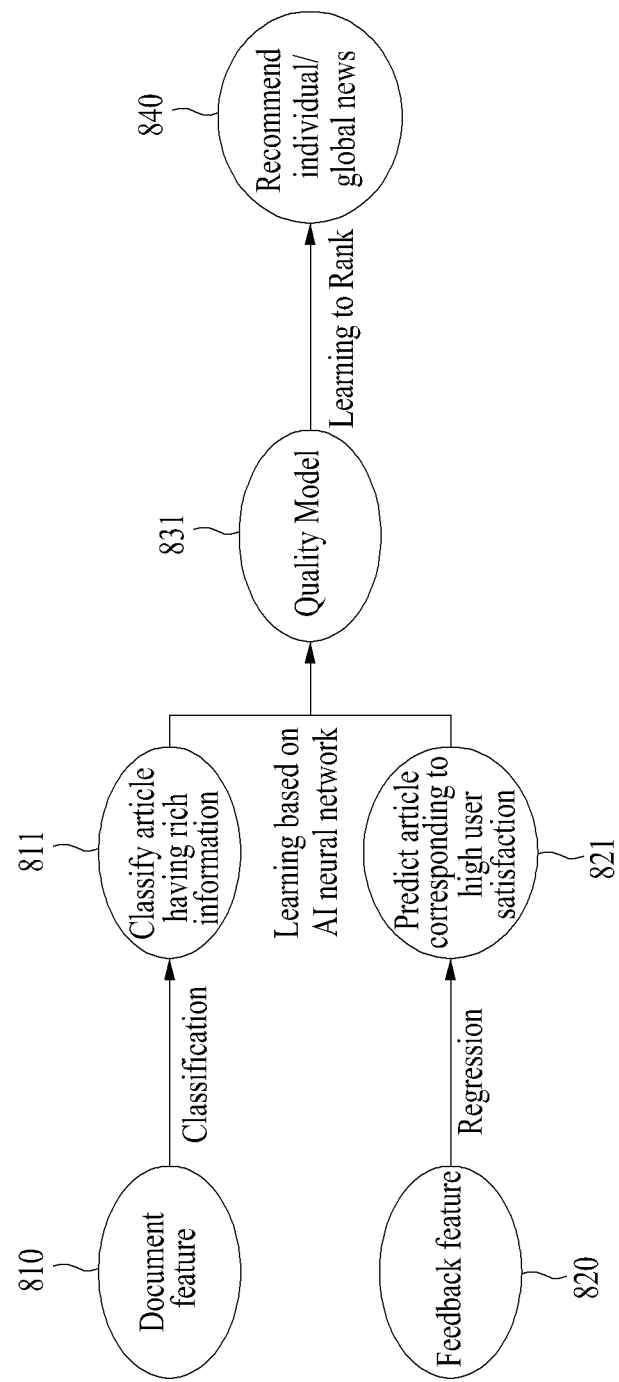
FIG. 8 illustrates an example of a process of providing a representative article based on artificial intelligence (AI) at a server according to at least one example embodiment.

FIG. 8 illustrates an example of a process of providing a representative article based on AI at a server (e.g., the server 100) according to at least one example embodiment.

The server may provide a different issue ranking for each user by applying an issue score for each user through integration between a ranking of a cluster and AI technology. Alternatively, the server may extract a different representative article from each of the clusters for each user based on an article score of a corresponding user that is derived based on AI. For example, the server may apply a differential article score for each individual, that is, each user. Also, the server may provide a different individual issue ranking by an issue score for each individual and/or an article score for each individual and a different representative article for each individual issue. For example, if a user logs in a service that provides articles, the server may provide a different issue and/or a different representative article based on an article score and/or an issue score for each individual.

According to some example embodiments, the server may provide unregistered and/or unauthenticated users a representative article based on a ranking of a cluster and/or article rankings selected by the server without user differentiation. For example, if the user does not log in the service that providing articles, the server may provide all of the users with a representative article that is based on a ranking of a cluster and/or article rankings selected by the server. Here, to provide a customized article by performing learning (e.g., machine learning) based on an AI neural network, a quality model configured to classify an article having rich information and an article corresponding to a high user satisfaction may be generated (e.g., by the server). For example, the AI neural network may be trained based on a neural network model, such as a convolutional neural network (CNN) and/or a recurrent neural network (RNN).

Figure 9:
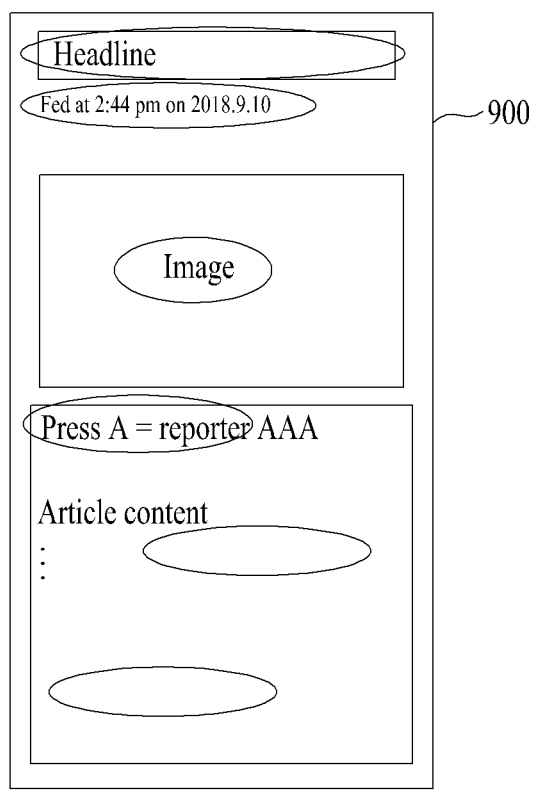
FIG. 9 illustrates an example of extracting a feature using a deep learning technique at a server according to at least one example embodiment.

The server may classify an article associated with an information amount based on a feature (e.g., an article feature) that is extracted by analyzing contents, for example, articles, included in at least one cluster. In operation 810, the server may extract a feature of a document from the document. FIG. 9 illustrates an example of extracting a feature. Referring to FIG. 9, the server (e.g., the server 100) may extract a feature from a document 900. For example, the document 900 may be content, for example, an article, including a text and/or an image. In operation 811, the server may extract the feature from the document 900 based on (e.g., the feature constituting) a title (headline), a main body, an image, byline, and/or a creation time (e.g., publication date and/or time) that are included in the document 900, and may classify an article as an article having rich information based on the extracted feature (e.g., one or more of the extracted features). According to some example embodiments, in operation 810, the server may determine a respective information richness score for each of a plurality of articles (e.g., the plurality of articles clustered in operation 410 discussed above and/or a training set of articles used to train a quality model and/or feature vector).

In operation 820, the server may extract a feedback feature of the document from the document. For example, referring to FIG. 9, the server may extract a feedback feature from the document 900 based on (e.g., the feedback features constituting) an amount of time a user stays in a corresponding article (e.g., an amount of time during which the user views the document 900 and/or an amount of time the document 900 is displayed to the user) and/or a number of references of the article (e.g., references to the document 900 from and/or by other documents and/or articles), and may predict (e.g., determine) an article corresponding to a high user satisfaction (e.g., an article desired by the user) based on the extracted feedback feature. In operation 821, the server may predict (e.g., determine) an article corresponding to a high user satisfaction by performing a regression analysis on the extracted feedback feature. For example, an article viewed by the user for a long duration and referenced by a large amount of other articles may be predicted to correspond to a high user satisfaction. According to some example embodiments, in operations 820 and 821, the server may determine a respective user satisfaction score for each of a plurality of articles (e.g., the plurality of articles clustered in operation 410 discussed above and/or a training set of articles used to train a quality model and/or feature vector).

In operation 831, the server may generate a quality model configured to learn the article including rich information and the article corresponding to the high user satisfaction. According to some example embodiments, the quality model may constitute a feature vector that is trained to identify articles having rich information and articles likely to satisfy users (e.g., a user of the service) based on the classifications of articles having rich information (e.g., the information richness scores) and articles resulting in high user satisfaction (e.g., the user satisfaction scores). The server may automatically select a representative article by performing learning for prioritizing the article having rich information and the article corresponding to the high user satisfaction through the quality model. For example, the server may sort articles included in each cluster and select a highest ranked article as the representative article based on the sorting. According to some example embodiments, the server may use the trained feature vector to select the representative article. For example, the feature vector may be trained to select an image having the most information and being most likely to satisfy the user, or may prioritize one of richness of information, or likelihood of satisfying the user, over the other. In operation 840, the server may recommend the selected representative article as customized individual/global news.

Figure 10:
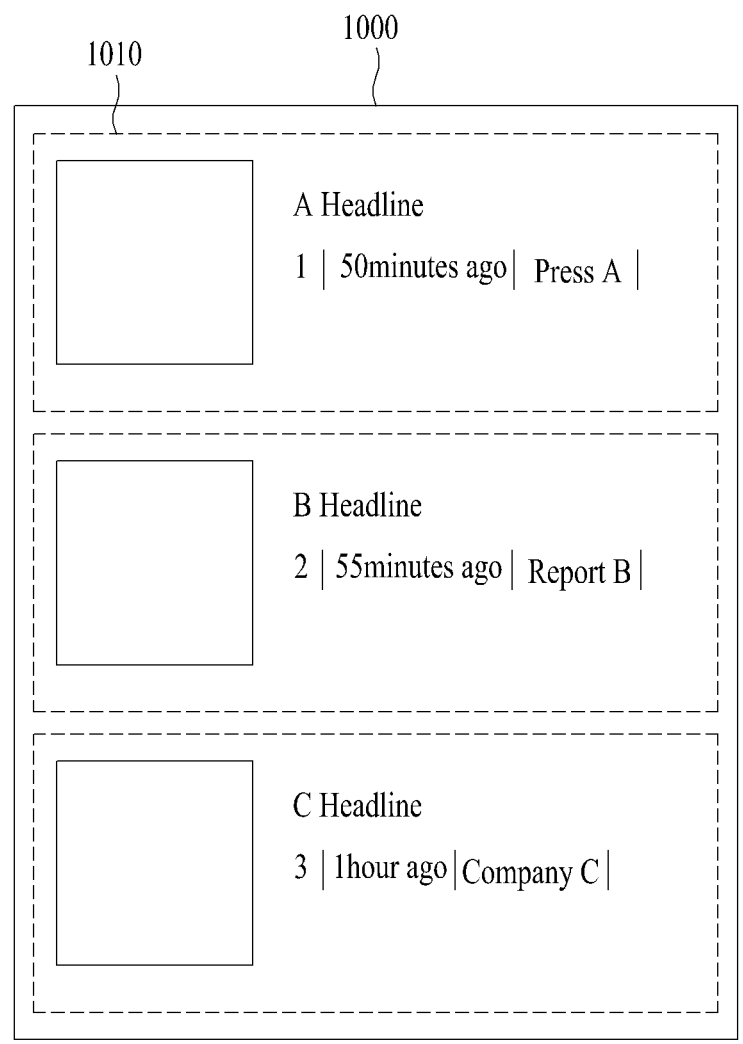
FIG. 10 illustrates an example of arranging representative articles at a server according to at least one example embodiment.

FIG. 10 illustrates an example of arranging representative articles at a server (e.g., the server 100) according to at least one example embodiment.

The server may predict the entire features in real time through article classification and/or a regression model. Importance of features may be automatically learned to a learning-to-rank model. The importance of features may be calculated by adding up a multiplication between a weight and an additional score with respect to each of the features based on the learning-to-rank model represented by Equation 2.

$$\text{quality}(d) = \sum_{f \in \text{feats}} \text{weight}_f \cdot \text{score}_f(d) \quad \text{[Equation 2]}$$

The server may select a representative article based on a result of modeling the features that are automatically learned based on AI through the quality model. Also, the server may arrange headlines of articles based on AI.

FIG. 10 illustrates an example of a service screen 1000 on which articles are displayed according to at least one example embodiment. For example, a representative article 1010 selected in response to AI-based learning may be automatically arranged on the service screen 1000 (e.g., arranged on the service screen 1000 by processing circuitry). For example, the representative article 1010 including a headline, a fed time (e.g., (1) publication date and/or time, and/or (2) an elapsed duration since the publication date and/or time), and a press (e.g., newspaper, magazine, blog, etc.) that has uploaded the representative article 1010 may be displayed. Here, the representative article 1010 may be selected by comparing values of articles analyzed to select the representative article 1010. Also, values of analyzed articles may be updated at set time intervals and the representative article 1010 may be reselected by comparing the updated values (e.g., determining the representative article based on the updated values). Also, the headline of the representative article 1010 may be displayed based on a result of modeling the features that are learned based on AI. Further, in response to a selection on the representative article 1010 displayed on the service screen 1000, articles (e.g., the content of the representative article and/or other articles in the cluster represented by the representative article) associated with the representative article 1010 may be provided. According to some example embodiments, the service screen 1000 may be displayed on the display 205 of the electronic device 110 as a graphical user interface based on a signal received from the server 100. According to some example embodiments, the server 100 may cause the electronic device 110 to display the graphical user interface including the service screen 1000 by transmitting the signal to the electronic device 110. The signal may include information including a representative article corresponding to a corresponding cluster of articles and an order in which two or more representative articles should be displayed in the service screen 1000. The representative article 1010 may be selected by the server (e.g., the server 100) according to some example embodiments described herein, and transmitted by the server to the electronic device 110 for display. The server may transmit the representative article 1010 in accordance with a service requested by the electronic device 110 and/or a user of the electronic device 110. According to some example embodiments, a representative article 1010 may be selected and transmitted by the server for a subset of clusters among a plurality of clusters. For example, the server may select three clusters among five determined clusters based on a rank of each cluster determined based on issue information as discussed above (e.g., one or more highest ranking clusters). A representative article 1010 for each of the three selected clusters may be selected and transmitted to the electronic device 110 by the server for display. The three representative articles 1010 corresponding to the three selected clusters may be displayed in order of the determined rank of the three selected clusters.

As discussed above, conventional methods, devices and/or systems for providing articles to users involves posting articles to Internet search engines, using which the users search for the articles. However, a large amount of articles are posted on the Internet search engines including many duplicate or similar articles describing the same or similar information and/or events. Accordingly, the conventional methods, devices and/or systems result in excessive delay in providing articles desired by the user and excessive effort by the user in finding the desired articles, resulting in an unsatisfactory user experience. According to some example embodiments, improved servers, non-transitory computer-readable media, and methods are provided that determine clusters among articles, rank the clusters to determine which are most likely to be desired by the user, select a representative article for each cluster, and/or transmit articles to the user desired or likely to be desired by the user and without or with reduced redundancy between articles. Thereby, the improved servers, non-transitory computer-readable media, and methods overcome the disadvantages of the conventional methods, devices and/or systems discussed above to reduce delay in providing articles desired by the user, reduce user effort in finding the desired articles, and/or provide an improved user experience.

The systems and/or apparatuses described herein may be implemented using hardware components, software components, and/or a combination thereof. For example, a processing device may be implemented using one or more special purpose computers, such as, for example, a processor, a controller and an arithmetic logic unit, a digital signal processor, a microcomputer, a field programmable array, a programmable logic unit, a microprocessor or any other device capable of responding to and executing instructions related to some example embodiments in a defined manner. The processing device may run an operating system (OS) and/or one or more software applications that run on the OS. The processing device also may access, store, manipulate, process, and/or create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing and/or configuring the processing device to operate as desired. Software and data may be embodied permanently or temporarily in any type of machine, component, physical or virtual equipment, computer storage medium and/or device, and/or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to some example embodiments may be recorded in non-transitory computer-readable record media including program instructions to implement various operations embodied by a computer. The media may also include, alone or in combination with the program instructions, data files, data structures, and/or the like. The media and/or program instructions may be those specially designed and constructed for the purposes, or they may be of the kind well-known and available to those having skill in the computer software arts. Examples of non-transitory computer-readable record media include magnetic media such as hard disks, floppy disks, and/or magnetic tape; optical media such as CD ROM disks and/or DVD; magneto-optical media such as floptical disks; and hardware devices that are specially to store and/or perform program instructions, such as read-only memory (ROM), random access memory (RAM), flash memory, and/or the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in some example embodiments, even if not specifically shown or described. The same may also be varied in many ways. Such variations are not to be regarded as a departure from the disclosure, and all such modifications are intended to be included within the scope of the disclosure.

What is claimed is:

1. A method of providing news articles by a server, the method comprising:
    determining a plurality of clusters of articles among a plurality of articles, each of the plurality of articles including a plurality of words;
    ranking each respective cluster among the plurality of clusters of articles with respect to other clusters among the plurality of clusters of articles based on issue information associated with the respective cluster to determine one or more highest ranked clusters; and
    causing an electronic device to display a graphical user interface including one or more representative articles corresponding to each of the one or more highest ranked clusters based on the ranking, each respective representative article among the one or more representative articles being selected from among two or more articles among the plurality of articles included in a corresponding cluster among the one or more highest ranked cluster.

2. The method of claim 1 wherein the ranking ranks each respective cluster based on an issue level, the issue level being determined based on the issue information including at least one of (i) a quantity of a first subset of articles among the plurality of articles included in the respective cluster or (ii) an article distribution based on time information associated with the respective cluster.

3. The method of claim 2, wherein the ranking further comprises:
    determining a relative section of the respective cluster based on a plurality of time periods elapsed from a plurality of publication times of the first subset of articles included in the respective cluster, and
    ranking the respective cluster according to a score based on the article distribution corresponding to the relative section.

4. The method of claim 3, wherein the ranking further comprises assigning a publication time based weight to the relative section based on the plurality of publication times of the first subset of articles.

5. The method of claim 2, wherein the ranking is based on the issue level determined based on issue information of a user and using artificial intelligence (AI).

6. The method of claim 1, further comprising:
    calculating an article score for each respective article among the plurality of articles, each of the plurality of articles being included in a corresponding cluster among the plurality of clusters of articles; and
    determining a priority of each respective article among the plurality of articles based on the article score for the respective article.

7. The method of claim 6, further comprising:
    adding a new factor to a group of factors used for calculating the article score,
    wherein the calculating the article score calculates the article score based on the group of factors including the new factor, the article score having a value within a defined range of values.

8. The method of claim 6, further comprising:
    assigning a respective weight to each of a group of factors used for calculating the article score, each respective weight having a value between 0 and 1,
    wherein the calculating the article score calculates the article score based on the group of factors and the respective weight assigned to each of the group of factors.

9. The method of claim 1, further comprising:
    selecting a representative article of each respective cluster among the plurality of clusters of articles by analyzing features of two or more articles among the plurality of articles included in the respective cluster, each of the one or more representative articles corresponding to each of the one or more highest ranked clusters being the selected representative article of a corresponding cluster among the one or more highest ranked cluster.

10. The method of claim 1, further comprising:
    selecting a different representative article of each respective cluster among the plurality of clusters of articles based on an article score of a user, each of the one or more representative articles corresponding to each of the one or more highest ranked clusters being the selected representative article of a corresponding cluster among the one or more highest ranked cluster.

11. The method of claim 9, wherein the selecting the representative article selects the representative article based on one or more features extracted by analyzing the two or more articles included in the respective cluster using a quality model based on an AI neural network.

12. The method of claim 11, wherein the selecting the representative article further comprises:
- determining a plurality of information richness scores corresponding to a plurality of training articles according to an information amount included in the plurality of training articles, the information amount being determined based on one or more article features,
- determining a plurality of user satisfaction scores corresponding to the plurality of training articles by extracting one or more feedback features related to the plurality of training articles, and
- training the quality model based on the AI neural network using the plurality of information richness scores and the plurality of user satisfaction scores.

13. The method of claim 12, wherein the selecting the representative article further comprises:
- sorting the two or more articles included in the respective cluster according to a priority based on a result of the training, and
- selecting the representative article from among the two or more articles included in the respective cluster based on the sorting.

14. A non-transitory computer-readable recording medium storing instructions that, when executed by processing circuitry, cause the processing circuitry to perform a method of providing news articles by a server, the method comprising:
- determining a plurality of clusters of articles among a plurality of articles, each of the plurality of articles including a plurality of words;
- ranking each respective cluster among the plurality of clusters of articles with respect to other clusters among the plurality of clusters of articles based on issue information associated with the respective cluster to determine one or more highest ranked clusters; and
- causing an electronic device to display a graphical user interface including one or more representative articles corresponding to each of the one or more highest ranked clusters based on the ranking, each respective representative article among the one or more representative articles being selected from among two or more articles among the plurality of articles included in a corresponding cluster among the one or more highest ranked cluster.

15. A server for providing news articles, the server comprising:
- processing circuitry configured to,
  - determine a plurality of clusters of articles among a plurality of articles, each of the plurality of articles including a plurality of words,
  - rank each respective cluster among the plurality of clusters of articles with respect to other clusters among the plurality of clusters of articles based on issue information associated with the respective cluster to determine one or more highest ranked clusters, and
  - cause an electronic device to display a graphical user interface including one or more representative articles corresponding to each of the one or more highest ranked clusters based on ranking each respective cluster among the plurality of clusters of articles, each respective representative article among the one or more representative articles being selected from among two or more articles among the plurality of articles included in a corresponding cluster among the one or more highest ranked cluster.

16. The server of claim 15, wherein the processing circuitry is configured to rank each respective cluster based on an issue level, the issue level being determined based on the issue information including at least one of (i) a quantity of a first subset of articles among the plurality of articles included in the respective cluster or (ii) an article distribution based on time information associated with the respective cluster.

17. The server of claim 16, wherein the processing circuitry is configured to:
- determine a relative section of the respective cluster based on a plurality of time periods elapsed from a plurality of publication times of the first subset of articles included in the respective cluster, and
- rank the respective cluster according to a score based on the article distribution corresponding to the relative section.

18. The server of claim 15, wherein the processing circuitry is configured to:
- calculate an article score for each respective article among the plurality of articles, each of the plurality of articles being included in a corresponding cluster among the plurality of clusters of articles, and
- determine a priority of each respective article among the plurality of articles based on the article score for the respective article.

19. The server of claim 18, wherein the processing circuitry is configured to:
- assign a respective weight to each of a group of factors used for calculating the article score, each respective weight having a value between 0 and 1, and
- calculate the article score based on the group of factors and the respective weight assigned to each of the group of factors.

20. The server of claim 15, wherein the processing circuitry is configured to select a representative article of each respective cluster among the plurality of clusters of articles based on one or more features extracted by analyzing two or more articles among the plurality of articles included in the respective cluster using a quality model based on an AI neural network, each of the one or more representative articles corresponding to each of the one or more highest ranked clusters being the selected representative article of a corresponding cluster among the one or more highest ranked cluster.

21. The method of claim 1 wherein the ranking ranks each respective cluster based on article ages of the plurality of clusters of articles.

* * * * *